United States Patent [19]

Taki

[11] Patent Number: 5,521,899
[45] Date of Patent: May 28, 1996

[54] OPTICAL DISK APPARATUS FOR MECHANICALLY RESTRICTING THE DISTANCE BETWEEN AN OPTICAL DISK AND AN OPTICAL HEAD

[75] Inventor: Yoshitsugu Taki, Kanagawa, Japan

[73] Assignee: Sony Corporation, Japan

[21] Appl. No.: 350,736

[22] Filed: Dec. 6, 1994

Related U.S. Application Data

[60] Continuation of Ser. No. 44,577, Apr. 7, 1993, abandoned, which is a division of Ser. No. 840,512, Feb. 24, 1992.

[30] Foreign Application Priority Data

Feb. 25, 1991 [JP] Japan ..................... 3-050205

[51] Int. Cl.⁶ ........................................... G11B 7/08
[52] U.S. Cl. ........................................ 369/244; 369/199
[58] Field of Search ................................. 369/291, 199, 369/244, 249, 215, 216, 219, 77.2; 360/133

[56] References Cited

U.S. PATENT DOCUMENTS 5,163,038  11/1992  Arai ........................................ 369/77.2
5,182,742  1/1993  Ohmori et al. ......................... 369/77.2

FOREIGN PATENT DOCUMENTS 1-113970  5/1989  Japan ..................................... 369/199
309227  11/1955  Switzerland ............................ 369/199
325514  12/1957  Switzerland ............................ 369/199

*Primary Examiner*—Stuart S. Levy
*Assistant Examiner*—Paul J. Ditmyer
*Attorney, Agent, or Firm*—Limbach & Limbach

[57] ABSTRACT

An optical disk cartridge and an optical disk apparatus wherein, whether or not an optical disk has a different thickness, the distances of a pair of optical heads to a pair of recording faces of the optical disk can be set readily with a high degree of accuracy. The optical disk cartridge comprises a cartridge including a pair of halves between which an optical disk is accommodated for rotation, and a sample plate having a thickness corresponding to the thickness of the optical disk and disposed in parallel to the optical disk at a position in the cartridge in which the sample plate does not interfere with the optical disk. A pair of restricting elements are provided in the optical disk apparatus and contacts, when the optical disk cartridge is loaded, with the opposite surfaces of the sample plate to mechanically restrict the distances of the optical heads from the recording faces of the optical disk.

5 Claims, 9 Drawing Sheets

OPTICAL DISK APPARATUS FOR MECHANICALLY RESTRICTING THE DISTANCE BETWEEN AN OPTICAL DISK AND AN OPTICAL HEAD

This is a continuation of co-pending application Ser. No. 08/044,577 filed on Apr. 7, 1993, now abandoned, which, in turn, is a divisional of application Ser. No. 07/840,512 filed on Feb. 24, 1992.

BACKGROUND OF THE INVENTION

1. Field of the Invention

This invention relates to an optical disk cartridge in which an optical disk having a pair of recording faces formed on the opposite surfaces thereof is accommodated and also to an optical disk apparatus for recording and/or reproducing such optical disk.

2. Description of the Prior Art

An optical disk apparatus is conventionally known wherein an optical disk having a pair of recording faces formed on the opposite upper and lower surfaces thereof is placed in position on a turntable and the recording faces of the optical disk are recorded and/or reproduced by means of a pair of upper and lower optical heads.

In an optical disk apparatus of the type mentioned, a spot of a laser beam is irradiated upon a recording face of an optical disk by means of an objective lens of an optical head to effect recording (writing) or reproduction (reading) of information to or from the recording face. Accordingly, recording or reproduction of an optical disk is difficult if the distances of the upper and lower optical heads to the upper and lower recording faces, respectively, of the optical disk (here, such distances are equivalent to the focal lengths of spots of laser beams) are not set with a high degree of accuracy so that the spots may be focused on the recording faces of the optical disk.

Meanwhile, the thickness of a disk cartridge for such optical disk is specified In the national or international standards. However, since an optical disk is normally formed from a glass base plate, a plastic base plate or the like and has a different structure depending upon a material used, it may have a different thickness depending upon the material used.

Meanwhile, in an optical disk apparatus of the type described above, the distances of the upper and lower optical heads to the upper and lower recording faces, respectively, of the optical disk are set with reference to a height or vertical position of a turntable of a spindle motor on which the optical disk is received.

Accordingly, when the optical disk received on the turntable has a different thickness, the distance particularly of the upper optical head to the upper recording face of the optical disk is different from a specified distance, and consequently, recording or reproduction by the upper optical head may be difficult or impossible.

Thus, an optical disk apparatus has been developed wherein a head base for the upper optical head is adjusted upwardly or downwardly under the servoing control of a motor in order to optimize the distance of the upper optical head to the upper recording face of an optical disk in accordance with a dispersion in thickness of the optical disk.

Such solution of adjusting the head base of the optical head upwardly and downwardly in accordance with a dispersion in thickness of an optical disk under the servoing control of the motor to set the distance of the optical head to the recording face of the optical disk as in the conventional optical disk apparatus described just above, however, is disadvantageous in that the mechanical and electric (a servo circuit is required) constructions are very complicated and besides the speed upon such setting is low and the reliability in setting is low.

SUMMARY OF THE INVENTION

It is an object of the present Invention to provide an critical disk cartridge and an optical disk apparatus wherein, whether or not an optical disk has a different thickness, the distances of a pair of optical heads to a pair of recording faces of the optical disk can be set readily with a high degree of accuracy.

In order to attain the object, according to an aspect of the present invention, there is provided an optical disk cartridge, which comprises an optical disk having a pair of recording faces formed on the opposite surfaces thereof, a cartridge including a pair of halves between which the optical disk is accommodated for rotation, and a sample plate having a thickness corresponding to the thickness of the optical disk and disposed in parallel to the optical disk at a position in the cartridge in which the sample plate does not interfere with the optical disk.

With the optical disk cartridge, the thickness of the optical disk can be detected readily with a high degree of accuracy with reference to the sample plate having a thickness corresponding to the thickness of the optical disk. Accordingly, even if the optical disk has a different thickness, the distances of a pair of optical heads of an optical disk apparatus to the recording faces of the optical disk can be set readily with a high degree of accuracy each time an optical disk cartridge is loaded In position into the optical disk apparatus.

According to another aspect of the present invention, there is provided an optical disk apparatus, which comprises a turntable of a spindle motor for removably receiving thereon an optical disk which has a pair of recording faces formed on the opposite surfaces thereof, a sample plate having a thickness corresponding to the thickness of the optical disk, means for receiving the sample plate in parallel to the optical disk at a position at which the sample plate does not interfere with the optical disk, a pair of optical heads mounted for relative movement toward the recording faces of the optical disk received on the turntable, and a pair of restricting means for contacting with the opposite surfaces of the sample plate received at the position to mechanically restrict the distances of the optical heads from the recording faces of the optical disk.

According to a further aspect of the present invention, there is provided an optical disk apparatus. which comprises means for removably loading in position an optical disk cartridge in which an optical disk having a pair of recording faces formed on the opposite surfaces thereof is accommodated for rotation and which has a sample plate having a thickness corresponding to the thickness of the optical disk and disposed at a position at which the sample plate does not interfere with the optical disk, a turntable of a spindle motor for removably receiving thereon the optical disk in the optical disk cartridge loaded in position, a pair of optical heads mounted for individual relative movement toward the recording faces of the optical disk received on the turntable, and a pair of restricting means for contacting with the opposite surfaces of the sample plate of the optical disk cartridge to mechanically restrict the distances of the optical heads from the recording faces of the optical disk.

With the optical disk apparatus, the distances of the optical heads to the recording faces of the optical disk in the optical disk cartridge loaded in position are mechanically restricted by contacting the pair of restricting means with the opposite surfaces of the sample plate having a thickness corresponding to the thickness of the optical disk. Accordingly, even if the optical disk has a different thickness, the distances of the optical heads to the recording faces of the optical disk can be set readily with a high degree of accuracy each time an optical disk cartridge Is loaded In position into the optical disk apparatus. Besides, such setting can be performed at a high speed In a high reliability with a simple structure.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
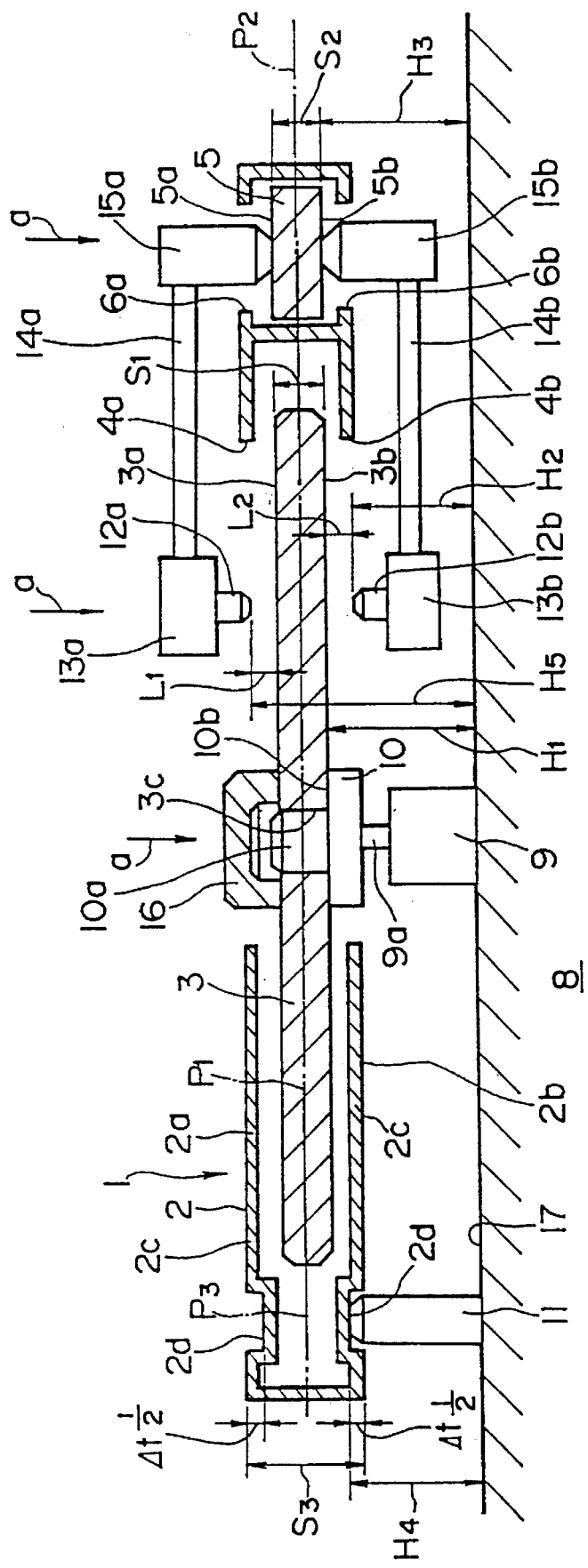
FIG. 1 is a side elevational sectional view of an optical disk cartridge and an optical disk apparatus showing a preferred embodiment of the present invention.
Figure 2:
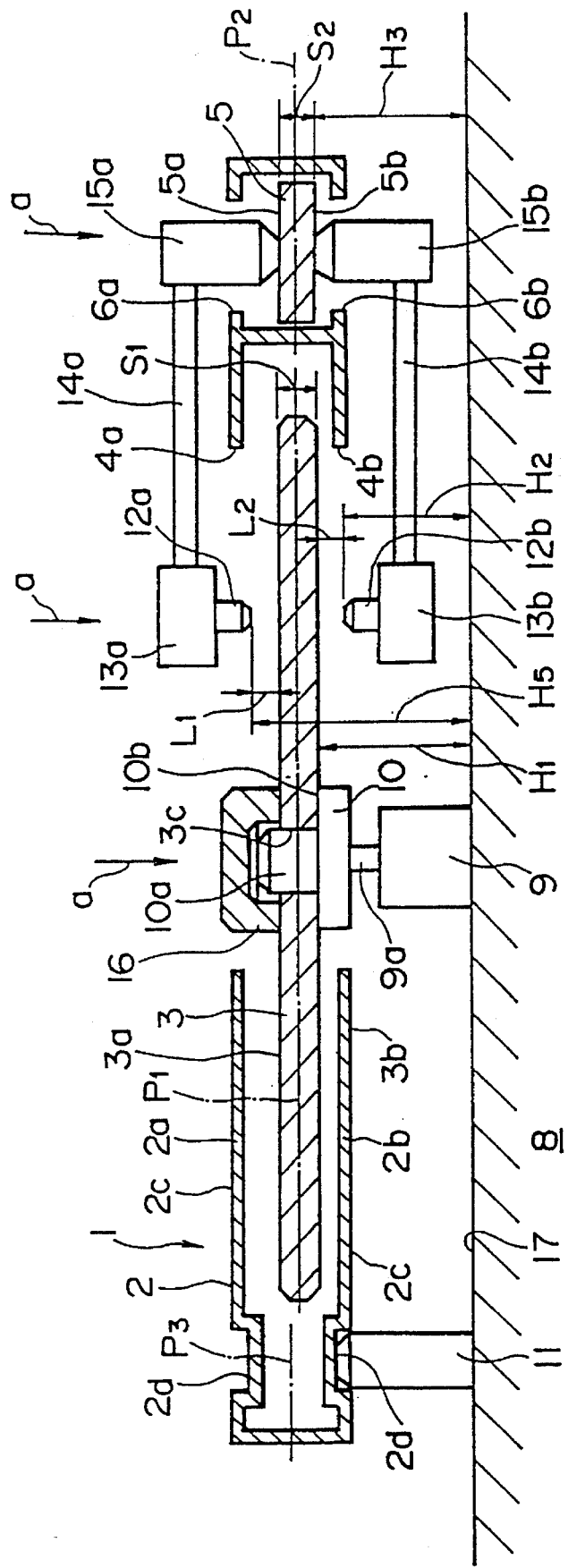
FIG. 2 is a similar view but showing the optical disk cartridge and optical disk apparatus when an optical disk having a different thickness is loaded.

Referring first to FIGS. 1 and 2, there is shown an optical disk cartridge and an optical disk apparatus to which the present invention is applied. The optical disk cartridge generally denoted at 1 includes a cartridge 2 composed of a pair of upper and lower halves 2a and 2b, and an optical disk 3 accommodated for rotation in the cartridge 2. The optical disk 3 has a pair of recording faces 3a and 3b formed on the opposite upper and lower surfaces thereof. The upper and lower halves 2a and 2b of the cartridge 2 have a pair of upper and lower openings 4a and 4b formed therein, respectively.

Each of the upper and lower openings 4a and 4b is in the form of an elongated hole and serves both as a turntable admitting hole and as a head admitting hole. A sample plate 5 having a circular shape or the like and having a thickness S2 corresponding to the thickness S1 of the optical disk 3 (for example. S1=S2) is provided adjacent an outer periphery of and in parallel to the optical disk 3 in the cartridge 2 such that it may not interfere with the optical disk 3. The upper and lower halves 2a and 2b have a pair of upper and lower small circular openings 6a and 6b formed therein in an opposing relationship to upper and lower faces 5a and 5b of the sample plate 5.

When the optical disk cartridge 1 is loaded in position into the optical disk apparatus 8, a turntable 10 securely mounted horizontally at the top end of a spindle 9a of a spindle motor 9 is relatively inserted from below into the cartridge 2 through the lower opening 4b, whereupon the optical disk 3 is fitted at a center hole 3c thereof with a center hub 10a of the turntable 10 so that it is received horizontally at an upper face 10b of the turntable 10. Then, upon such loading of the optical disk cartridge 1, the sample plate 5 is positioned together with the optical disk 3 to a position in the optical disk apparatus 8 at which it does not interfere with the optical disk 3. It is to be noted that, in this instance, the cartridge 2 is received horizontally on a plurality of height reference pins 11 some of which are formed as positioning pins.

The optical disk apparatus 8 includes a pair of upper and lower optical heads 13a and 13b having objective lenses 12a and 12b, respectively, a pair of upper and lower restricting elements 15a and 15b in the form of vertical pins mounted on optical head bases 14a and 14b of the optical heads 13a and 13b and extending in the vertically opposite directions, respectively, a chucking plate 16, and so forth. When the optical disk cartridge 1 is loaded in position into the optical disk apparatus 8, the lower optical head 13b is relatively inserted from below into the lower opening 4b so that the objective lens 12b thereof comes to a position at a distance L2 from the lower recording face 3b of the optical disk 3. It is to be noted that, after the optical disk cartridge 1 is received in position, the chucking plate 16 is inserted from above into the upper opening 4a so that it is fitted with an inner periphery of the center hole 3c of the optical disk 3 from above in the direction indicated by an arrow mark a and presses the optical disk 3 against the upper surface 10b of the turntable 10 to hold the optical disk 3 against the turntable 10.

Further, when the optlcal disk cartridge 1 is loaded, the lower restricting element 15b is relatively inserted from below into the lower small opening 6b and contacted perpendicularly with the lower surface 5b of the sample plate 5.

After the optical disk cartridge 1 is loaded, the upper optical head 13a and upper restricting element 15a are moved down together with each other in the direction indicated by the arrow mark a by the upper optical head base 14a so that the upper restricting element 15a is inserted from above into the upper small opening 6a and contacted perpendicularly with the upper surface 5a of the sample plate 5 while the upper optical head 13a is inserted from above into the upper opening 4a so that the objective lens 12a thereof comes to a position at a distance L1 from the upper recording face 3a of the optical disk 3.

In this instance, the upper surface 10b of the turntable 10, objective lens 12b of the lower optical head 13b, lower restricting means 15b and height reference pins 11 are set to predetermined heights or vertical positions H1, H2, H3 and H4, respectively, with respect to a height reference surface 17 of the optical disk apparatus 8. Here, for example. H1=H3.

Accordingly, the vertical center P1 of the optical disk 3 loaded in such a manner as described above and the vertical center P2 of the sample plate 5 are positioned at the same height, and the distance L2 of the objective lens 12b of the lower optical head 13b from the lower recording face 3b of the optical disk 3 is set to a predetermined optimum value.

On the other hand, when the upper optical head 13a and upper restricting element 15a are moved down together with each other in the direction of the arrow mark a by the upper optical head base 14a, the upper restricting element 15a is contacted with the upper surface 5a of the sample plate 5 so that further downward movement thereof is prevented. Consequently, the downward movement of the upper optical head 13a is automatically stopped maintaining a fixed positional relationship to the upper restricting element 15a in the vertical direction.

As a result, the objective lens 12a of the upper optical head 13a is mechanically restricted to a predetermined height H5 with respect to the height reference surface 17, and consequently, the distance L1 of the objective lens 12a of the upper optical head 13a from the upper recording face 3a of the optical disk 3 is set to a predetermined optimum value readily with a high degree of accuracy. In short, H3=H2+L2. H5=H3+S2+12, H5−H3=S1+L1+L2, and L1=L2.

Accordingly, only if the thickness S2 of the sample plate 5 is adjusted in accordance with a dispersion in thickness of the optical disk 3 such that, when the thickness S1 of the optical disk 3 is comparatively great as shown in FIG. 1, also the thickness 82 of the sample plate 5 is great correspondingly, but when the thickness S1 of the optical disk 3 is comparatively small as shown in FIG. 2, also the thickness S2 of the sample plate 5 is small correspondingly, then the distances L1 and L2 of the objective lenses 12a and 12b of the upper and lower optical heads 13a and 13b from the upper and lower recording faces 3a and 3b of the optical disk 3 can be mechanically set readily with a high degree of accuracy with reference to the thickness S2 of the sample plate 5.

It is to be noted that the cartridge 2 is contacted at a plurality of reference faces 2d, which are individually formed on the opposite upper and lower walls 2c thereof, with the height reference pins 11. Thus, the reference faces 2d of the cartridge 2 are spaced individually from the upper and lower walls 2c by one half an amount Δt of difference in thickness of the optical disk 3 from a maximum thickness of the optical disk 3 within a range of difference in thickness S1. Further, if the thickness S3 of the cartridge 2 is increased by the amount Δt by which the thickness S1 of the optical disk 3 is increased, then the vertical center P1 of the optical disk 3, the vertical center P2 of the sample plate 5 and the vertical center P3 of the cartridge 2 can be positioned at the same height.

Subsequently, the optical disk cartridge 1 will be described in more detail with reference to FIGS. 3 to 7.

Figure 3:
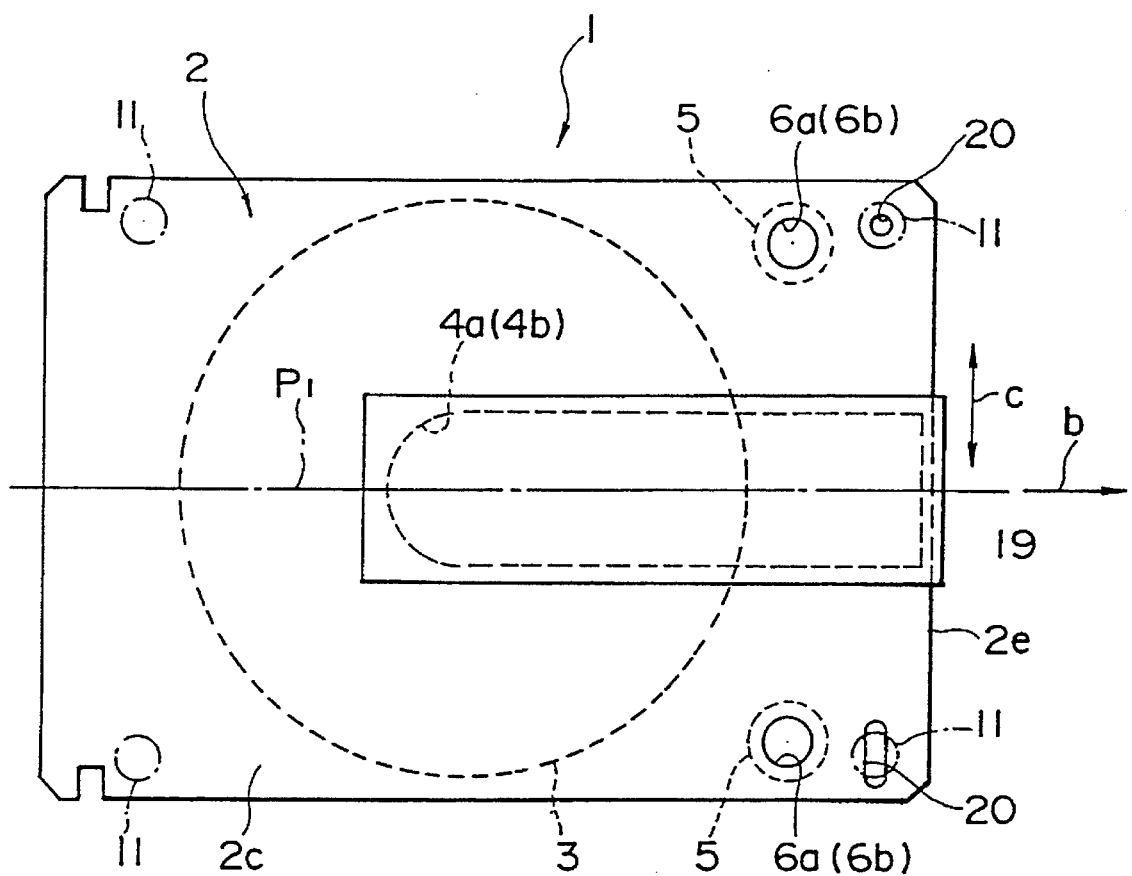
FIG. 3 is a plan view of the optical disk cartridge.
Figure 4:
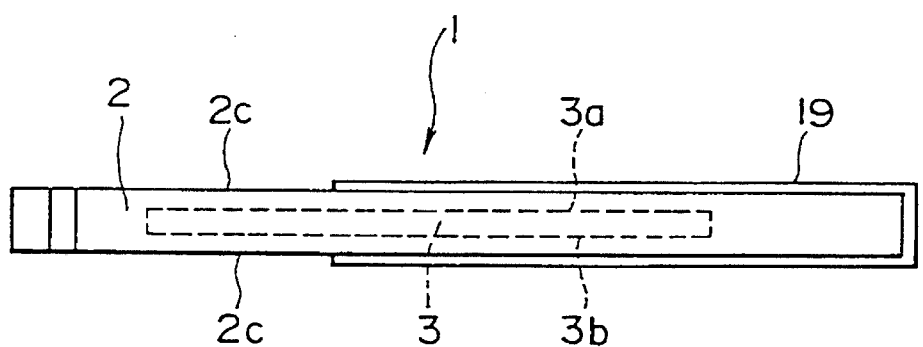
FIG. 4 is a side elevational view of the optical disk cartridge.
Figure 5:
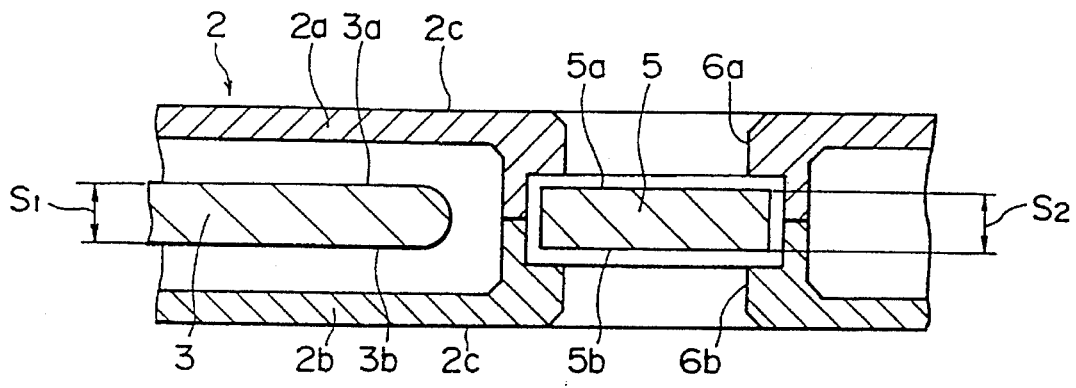
FIG. 5 is an enlarged sectional view showing a sample plate of the optical disk cartridge.

First, referring to FIGS. 3 and 4, the cartridge 2 in which the optical disk 3 is accommodated horizontally for rotation is of the double side type such that it can be loaded with either of the upper and lower walls 2c thereof on the height reference pins 11 of the optical disk apparatus 8. The upper and lower openings 4a and 4b are each formed as an elongated hole which extends along the center P1 of the cartridge 2 from a mid portion of the cartridge 2 to an end portion 2e of the cartridge 2 in the direction indicated by an arrow mark b which coincides with a direction in which the cartridge 2 is inserted into the optical disk apparatus 8. The upper and lower openings 4a and 4b are opened or closed by a shutter 19 having a substantially channel-shaped profile when the shutter 19 is slidably moved in either of the directions Indicated by a double-sided arrow mark c. Two pairs of upper and lower positioning holes 20 in the form of round holes and elongated holes are formed symmetrically with respect to the center P1 at the opposite end portions adjacent the end portion 2e of the upper and lower walls 2c of the cartridge 2 In the directions Indicated by the double-sided arrow mark c. The upper and lower circular small openings 6a and 6b are formed in pair At the opposite end portions of the upper and lower walls 2c of the cartridge 2 in the directions of the double-sided arrow mark c displaced from the outer periphery of the optical disk 3 toward the end portion Referring now to FIG. 5, such sample plate 5 as described above is held horizontally in each of a pair of holding holes 20a of a circular shape or the like formed horizontally between the upper and lower halves 2a and 2b of the cartridge 2 and between the corresponding upper and lower small openings 6a and 6b. The sample plates 5 may be held for vertical movement within a limited range.

Figure 6:
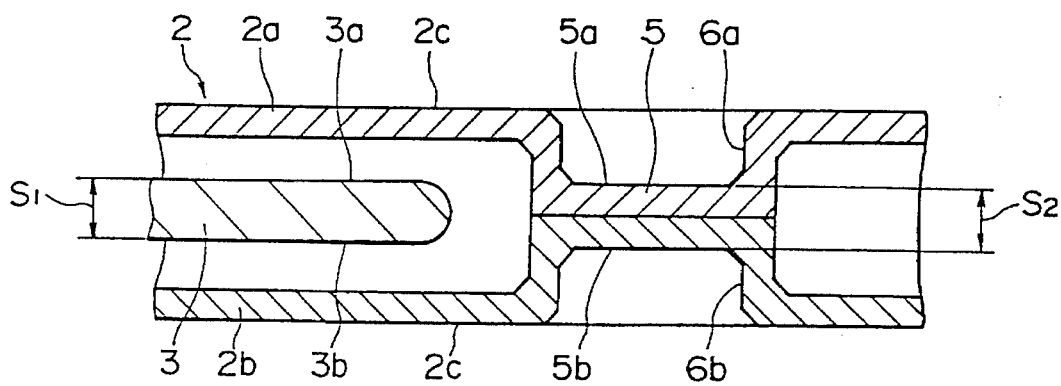
FIG. 6 is a similar view but showing a modification to the sample plate of FIG. 5.

Meanwhile, the sample plates 5 may be molded integrally as part of the upper and lower halves 2a and 2b as shown in FIG. 6.

Figure 7:
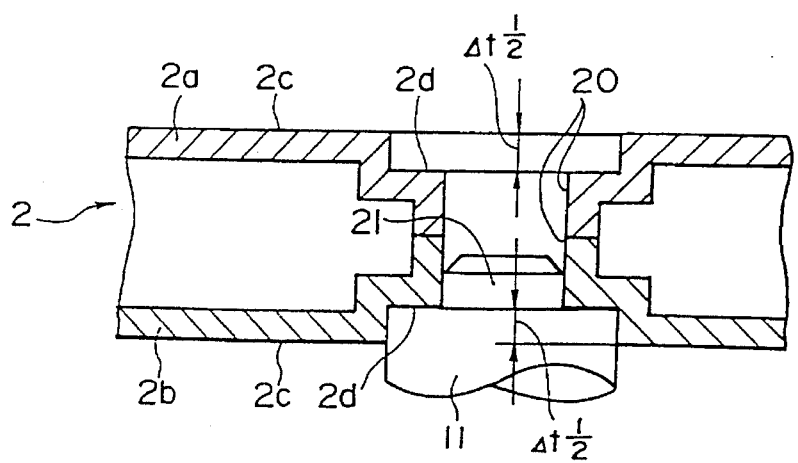
FIG. 7 is a sectional view showing a positioning hole in the modified sample plate of FIG. 6.

Referring now to FIG. 7, the positioning holes 20 An the upper and lower halves 2a and 2b of the cartridge 2 extend, for example, vertically through the cartridge 2, and the upper and lower ends of them are expanded in diameter and outer axial end faces of them serve as the reference faces 2d. Then, when the cartridge 2 is loaded into the optical disk apparatus 8 and the top ends of the height reference pins 11 are contacted relatively from below with the reference faces 2d of the cartridge 2, positioning pins 21 formed at the top ends only of a pair of ones of the height reference pins 11 are inserted relatively from below into the positioning holes 20 thereby to effect positioning of the cartridge 2 in a horizontal direction. As described above, depressions having a vertical dimension equal to one half the amount At described hereinabove are formed adjacent the height reference faces 2d in accordance with the necessity.

Subsequently, details of the optical disk apparatus 8 will be described with reference to FIGS. 8 to 13.

Figure 8:
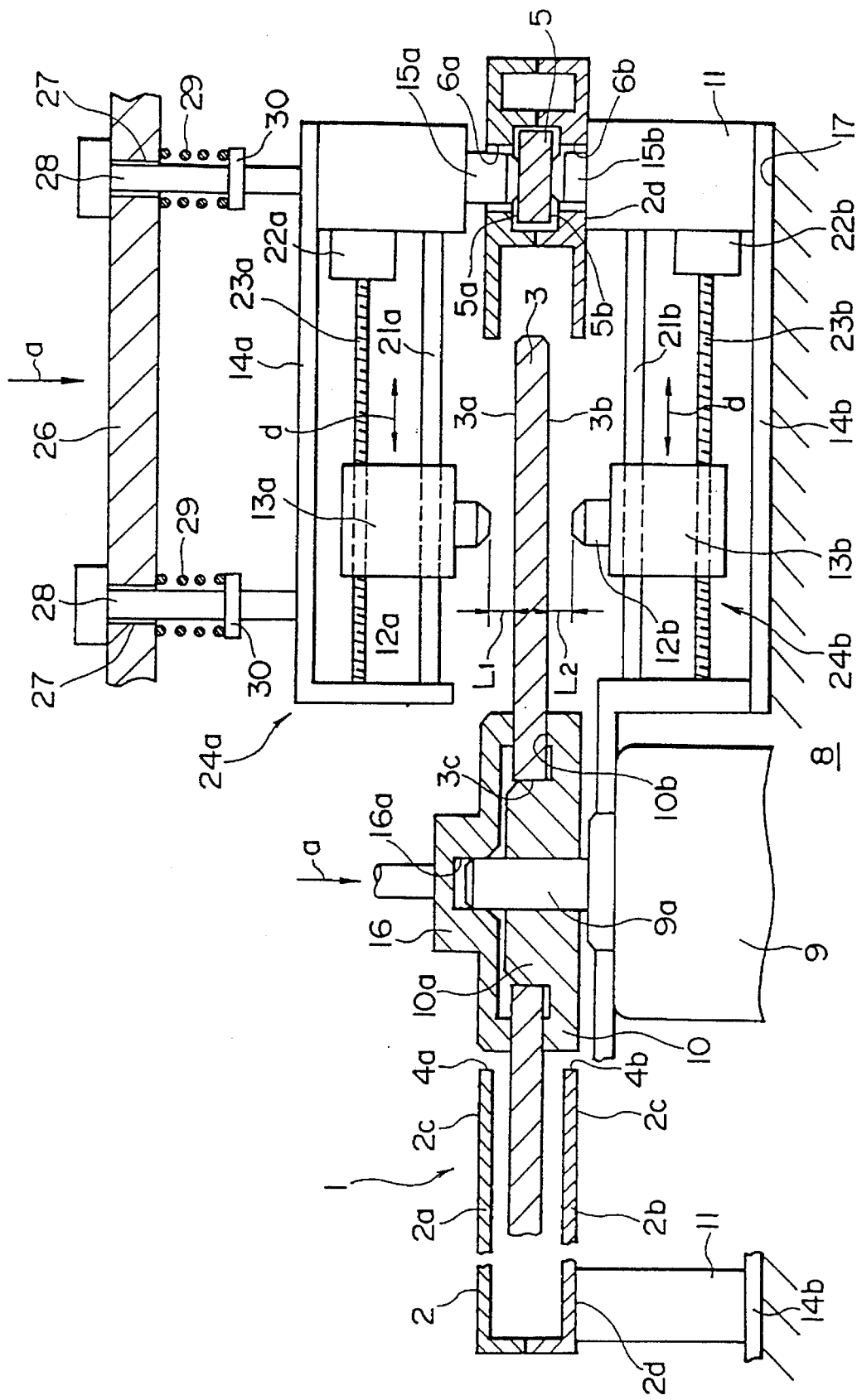
FIG. 8 is a side elevational view, partly in section, showing the optical disk apparatus of FIG. 1.

Referring first to FIG. 8, when the optical disk cartridge 1 is loaded, the optical disk 3 therein is fitted at the center hole 3c thereof with the center hub 10a of the turntable 10, and the chucking plate 16 presses against a portion of the optical disk 3 around the center hole 3c in the direction of the arrow mark a. Thereupon, the top end of the spindle 9a is fitted into a center hole 16a formed at the center of the lower face of the chucking plate 16.

The upper and lower optical head bases 14a and 14b have mounted respectively thereon a pair of upper and lower guide rods 21a and 2lb for the upper and lower optical heads 13a and 13b, a pair of upper and lower stepping motors 22a and 22b, a pair of upper and lower lead screws 23a and 23b, a pair of restricting elements 15a and 15b in the form of upper and lower vertical pins, and so forth, thereby constituting a pair of upper and lower optical head blocks 24a and 24b, respectively. The lower optical head base 14b is securely disposed at the height reference faces 17a, and the height reference pins 11 are mounted on the lower optical head base 14b. Meanwhile, the upper optical head base 14a of the upper optical head base block 24a is suspended by a plurality of vertical suspending pins 28 suspended for vertical movement within a fixed range in a plurality of suspending holes 27 of a lifting driving member 26, a plurality of suspending springs 29 in the form of compression springs and a plurality of spring receivers 30.

After the optical disk cartridge 1 is loaded such that the cartridge 2 is received horizontally onto the height reference pins 11 while the sample plates 5 are contacted with the lower restricting elements 15b as described hereinabove, the upper optical head block 24a is moved down in the direction of the arrow mark a by the lifting driving member 26. Then, the upper restricting elements 15a are pressed against the upper surfaces 5a of the sample plates 5 so that the distances L1 and L2 of the objective lenses 12a and 12b of the upper and lower optical heads 13a and 13b from the upper and lower recording faces 3a and 3b of the optical disk 3, respectively, are set with a high degree of accuracy.

Then, the optical disk 3 is driven to rotate by the turntable 10 of the spindle motor 9, and the upper and lower lead screws 23a and 23b are driven to rotate by the upper and lower stepping motors 22a and 22b so that the upper and lower optical heads 13a and 13b are fed stepwise in either of the directions indicated by a double-sided arrow mark d, that is, in a radial direction of the optical disk 3, under the guidance of the upper and lower guide rods 21a and 21b, respectively. Then, spots of laser beams are irradiated upon the upper and lower recording faces 3a and 3b of the optical disk 3 by the upper and lower objective lenses 12a and 12b of the upper and lower optical heads 13a and 13b to effect recording (writing) or reproduction (reading) of information onto or from the upper and lower recording faces 3a and 3b, respectively. Thereupon, since the distances L1 and L2 are set with a high degree of accuracy, the spots of the laser beams are focused correctly on the upper and lower recording faces 3a and 3b, and consequently, recording or reproduction of information can be performed with a high degree of accuracy.

It is to be noted that the lower restricting elements 15b may be formed at the top ends of a pair of the height reference pins 11 so that they may serve also as the height reference pins 11.

Subsequently, a mounting apparatus of the optical disk cartridge 1 into the optical disk apparatus 8 will be described with reference to FIGS. 9 to 13.

Figure 9:
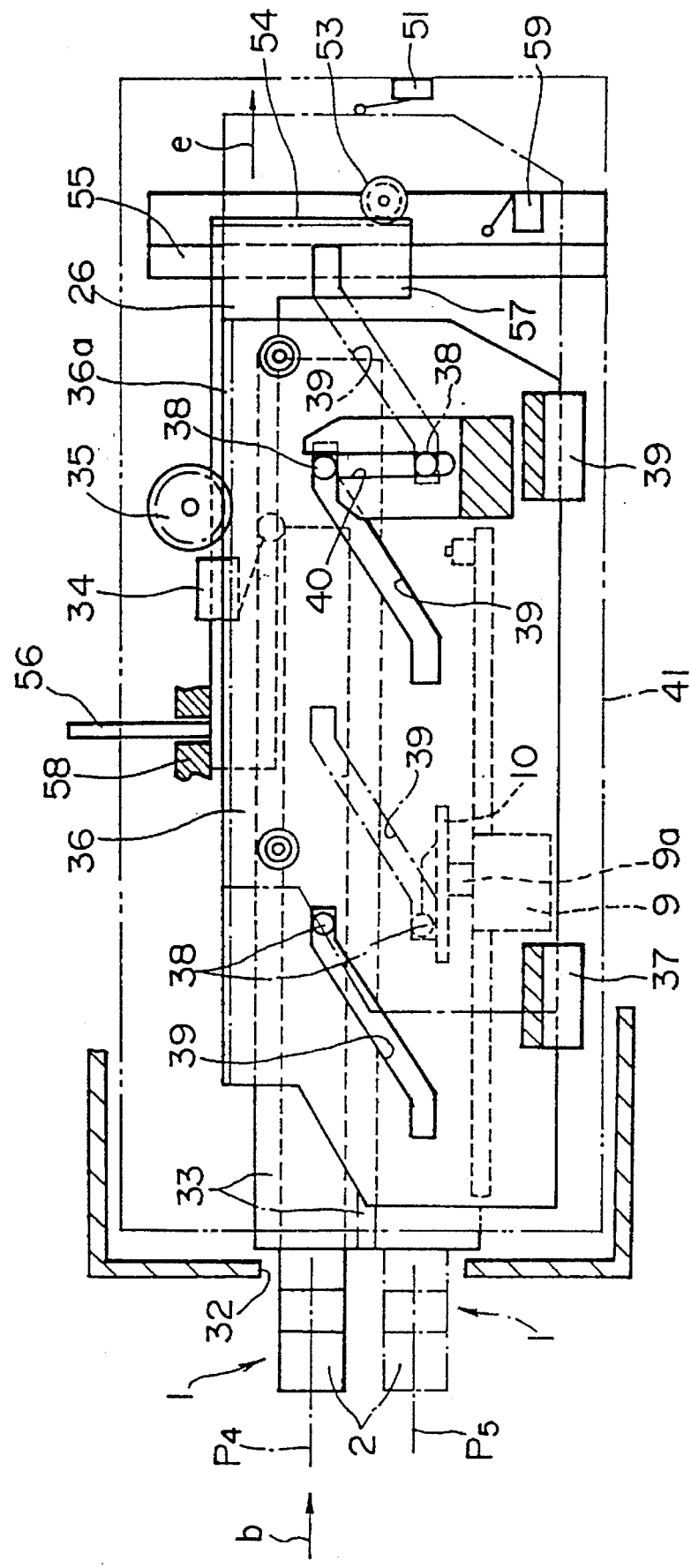
FIG. 9 is a side elevational view, partly in section, showing an optical disk cartridge mounting apparatus of the optical disk apparatus.
Figure 10:
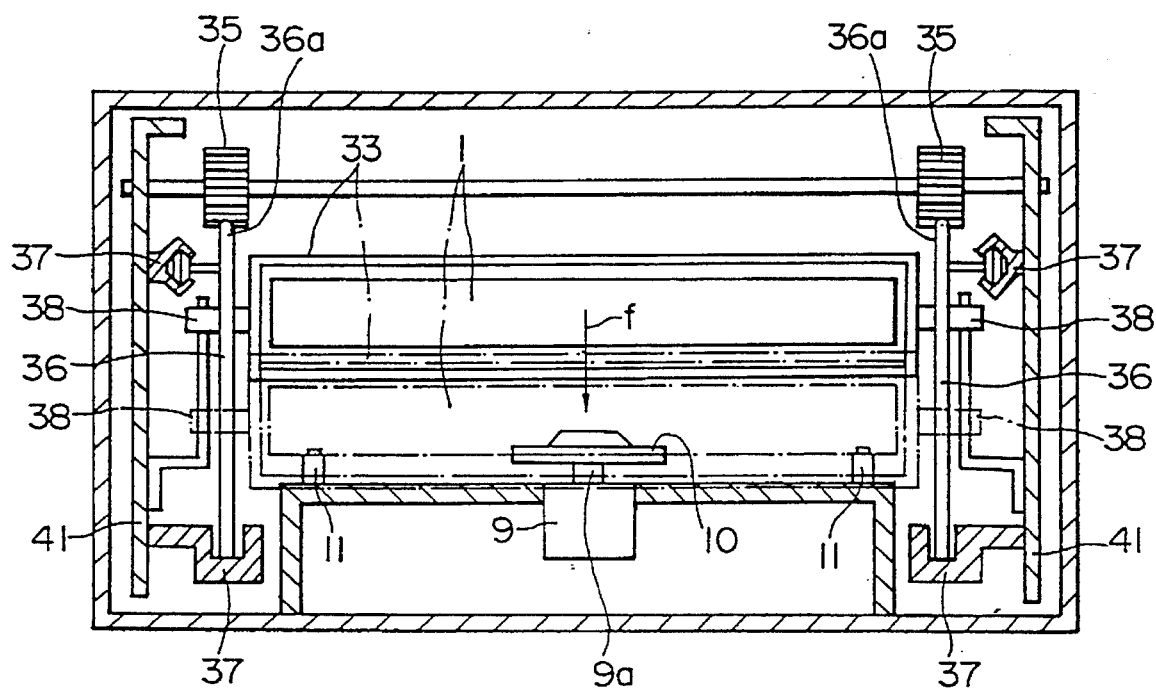
FIG. 10 is a front elevational sectional view of the optical disk cartridge mounting apparatus.
Figure 11:
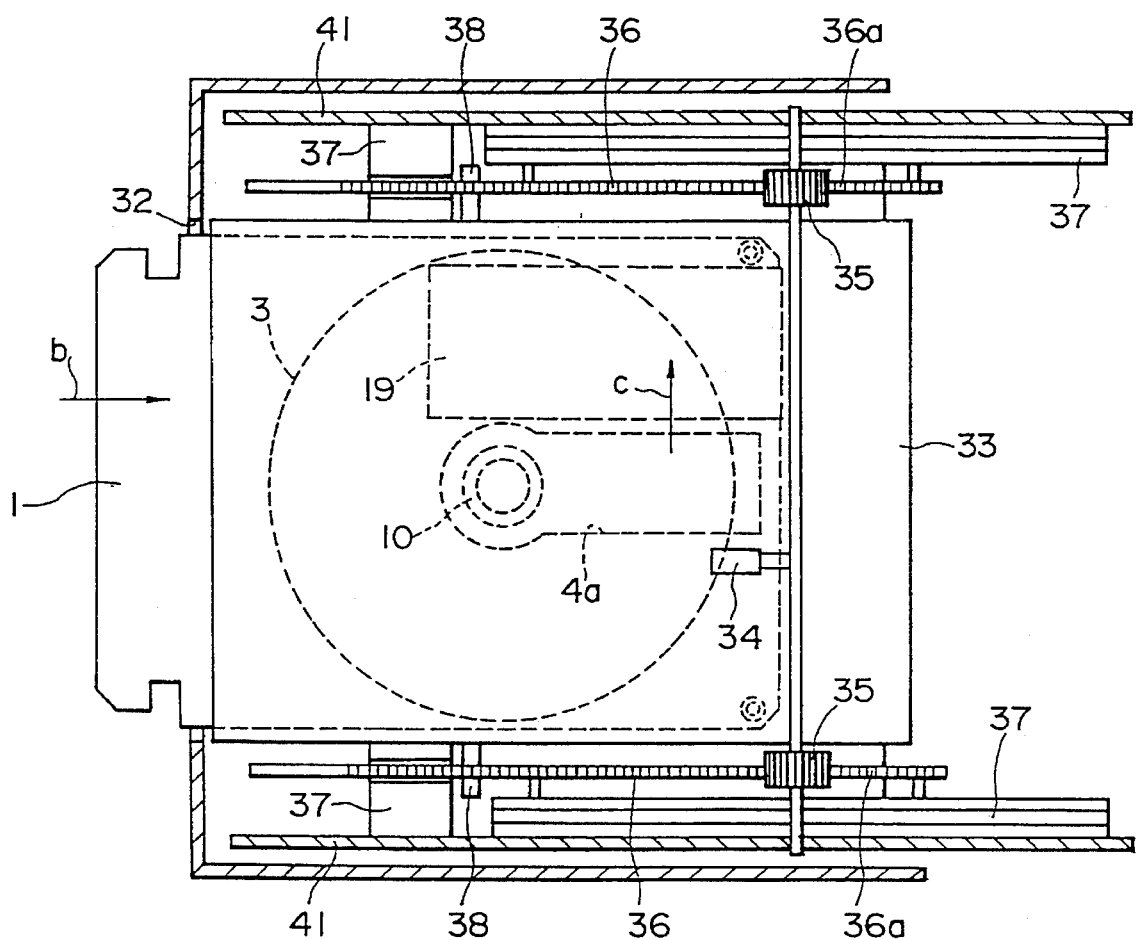
FIG. 11 is a horizontal sectional view of the optical disk cartridge mounting apparatus.

Referring first to FIGS. 9 to 11, when the optical disk cartridge 1 is inserted horizontally in the direction indicated by an arrow mark b into a cartridge holder 33 through a cartridge insertion opening 32, the shutter 19 is opened In the direction indicated by an arrow mark c in FIG. 11. Then, when the optical disk cartridge 1 is inserted fully into the cartridge holder 33, this is detected by a switch 34 and a pair of pinions 35 are driven to rotate simultaneously with each other by a loading motor not shown. A pair of racks 86a formed horizontally on a pair of vertical rack plates 86 are driven simultaneously with each other by the pinions 35 so that the rack plates 36 are slidably moved horizontally in the direction indicated by an arrow mark e in FIG. 9 under the guidance of a plurality of upper and lower slide guides 37 mounted on a pair of chasses 41.

Thereupon, a plurality of rollers 38 mounted on the opposite outer side faces of the cartridge holder 33 are guided by a plurality of corresponding inclined guideways 89 formed in the rack plates 36 while a plurality of other similar rollers 38 are guided by vertical grooves 89 formed in the chasses 41 so that the cartridge 33 is moved down by vertical parallel movement in the direction indicated by an arrow mark f in FIG. 10 from a cartridge insertion position P4 to another cartridge mounting position P5 shown in FIG. 9. Then, the cartridge 2 of the optical disk cartridge 1 is received horizontally on the height reference pins 11 while the optical disk 3 is received horizontally on the turntable 10 as described hereinabove.

Figure 12:
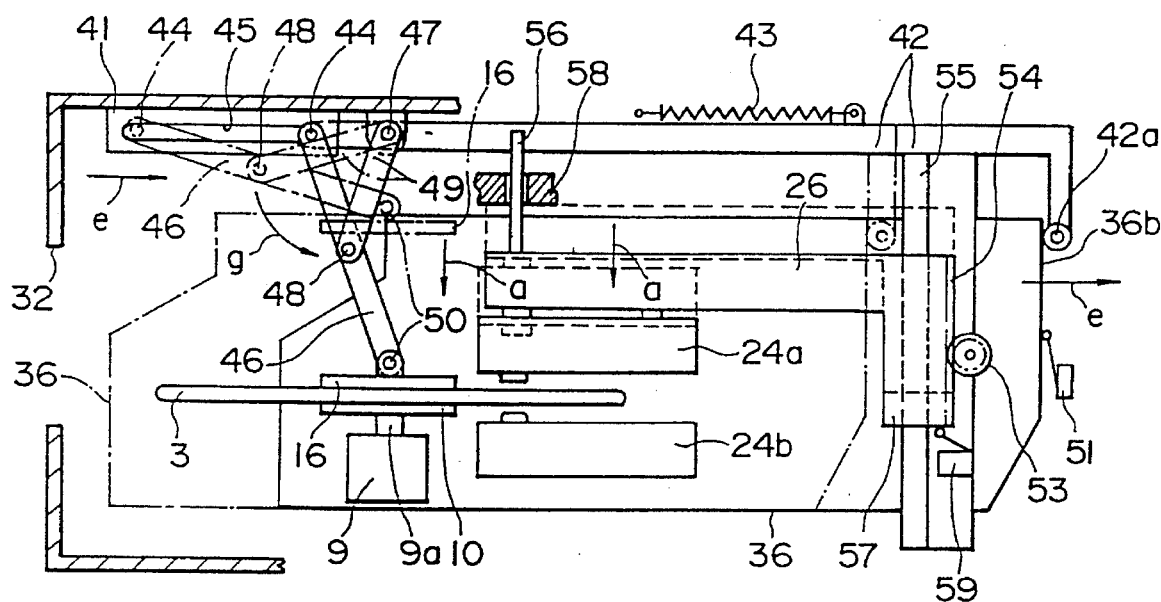
FIG. 12 is a side elevational view, partly in section, showing a chucking plate and a lifting apparatus for an upper optical head block of the optical disk cartridge mounting apparatus.

Referring now to FIG. 12, when the rack plates 36 are slidably moved in the direction indicated by an arrow mark e, a roller 42a at an end of a chuck driving arm 42 is pushed in the direction of the arrow mark e by an end face 36b of one of the rack plates 36 so that the chucking driving arm 42 is moved in the direction of the arrow mark e against a return spring 43. Consequently, a pin 44 at the other end of the chucking driving arm 42 is moved in the direction of the arrow mark e along a horizontal elongated hole 45 formed in a corresponding one of the chasses 41 to move an upper end of a chucking lifting arm 46 mounted for pivotal motion on the pin 44 in the direction of the arrow mark e, and thereupon, an interlocking arm 49 having an upper end mounted pivotal motion on the chassis 41 by means of a fulcrum pin 47 and having a lower end connected to a mid portion of the chucking lifting arm 46 by means of a pin 48 is pivoted in the direction indicated by an arrow mark As a result, the chucking plate 16 mounted at a lower end of the chucking lifting arm 46 by means of a pin 50 is moved down in the direction indicated by an arrow mark a from its lifted position indicated by a chain line in FIG. 12 to a lowered position indicated by a solid line so that the chucking plate 16 holds the optical disk 3 against the turntable 10 from above.

Figure 13:
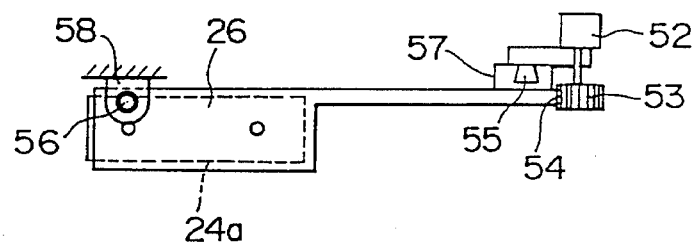
FIG. 13 As a plan view of the lifting apparatus for the upper optical head block.

Then, when the rack plates 36 are slidably moved fully in the direction of the arrow mark e as shown in FIGS. 12 and 13, this is detected by a switch 51. Consequently, the loading motor is stopped while at the same time a lifting driving pinion 53 is driven to rotate by a lifting motor 52. The pinion 53 drives a rack 54 formed vertically on the lifting driving member 26 so that the lifting driving member 26 is moved down by vertical parallel movement in the direction of the arrow mark a under the guidance of a vertical guide rail 55 and a guide rod 56. As a result, the upper optical head block 24a is moved down In the direction indicated by an arrow mark a In FIG. 12 from its lifted position indicated by an alternate long and short dash line in FIG. 12 to its lowered position indicated by a solid line so that the upper optical head 16a approaches the upper recording face 3a of the optical disk 3. Then, the lowered position of the lifting driving member 26 is detected by a switch 59, and thereupon, the lifting motor 52 is stopped. It is to be noted that the guide rail 55 is securely mounted vertically on the chassis 41 or the like, and a thrust bearing 57 is securely mounted on the lifting driving member 26 and is fitted without a play on the guide rail 55 in such fitting as dovetail fitting so that it is slidably moved vertically. Meanwhile, the guide rod 56 is securely mounted vertically on the lifting driving member 26 so that the lifting driving member 26 is slidably moved vertically without a play by means of a thrust bearing 58 mounted on the chassis 41 or the like. When the optical disk cartridge 1 is to be unloaded, the optical disk cartridge mounting apparatus operates reversely to that described hereinabove.

Having now fully described the invention, it will be apparent to one of ordinary skill in the art that many changes and modifications can be made thereto without departing from the spirit and scope of the invention as set forth herein.

What is claimed is:

1. An optical disk apparatus comprising:

means for removably loading in position an optical disk cartridge in which an optical disk having a first thickness and having a pair of recording faces formed on the opposite surfaces thereof is accommodated for rotation, the optical disk cartridge having a sample plate of a second thickness determined in accordance with the first thickness of the optical disk and disposed at a position at which said sample plate does not interfere with the optical disk;

a turntable of a spindle motor for removably receiving thereon the optical disk in the optical disk cartridge loaded in position;

a pair of optical heads mounted for individual relative movement toward the recording faces of the optical disk received on said turntable; and a pair of restricting means for contacting with the opposite surfaces of said sample plate of the optical disk cartridge to mechanically restrict the distances of said optical heads from the recording faces of the optical disk.

2. The optical disk apparatus according to claim 1, wherein the first thickness is equal to the second thickness.

3. The optical disk apparatus according to claim 2, wherein said optical disk and said sample plate are disposed in the same plane.

4. An optical disk recording and/or reproducing apparatus for recording and/or reproducing data on an optical disk having upper and lower surfaces bearing recording areas, said disk rotatably housed within an optical disk cartridge, said apparatus comprising:

a turntable for receiving said optical disk;

a sample plate in said optical disk cartridge having a particular thickness corresponding to the thickness of said optical disk in said optical disk cartridge;

a lower optical head for accessing the lower surface of said optical disk;

a first restricting means fixedly connected to said lower optical head for receiving a lower surface of said sample plate whereby a distance between said lower optical head and said lower surface of said optical disk is fixed;

an upper optical head for accessing the upper surface of said optical disk; and second restricting means fixedly connected to said upper optical head for engaging an upper surface of said sample plate whereby a distance between said upper optical head and the upper surface of said optical disc is fixed.

5. A optical disk apparatus as set forth in claim 4 wherein said second restricting means is moveable normal to said upper surface of said optical disk.

* * * * *